Feb. 8, 1949.  A. A. RADTKE  2,461,234
ADJUSTABLE CLAMP
Filed May 18, 1945
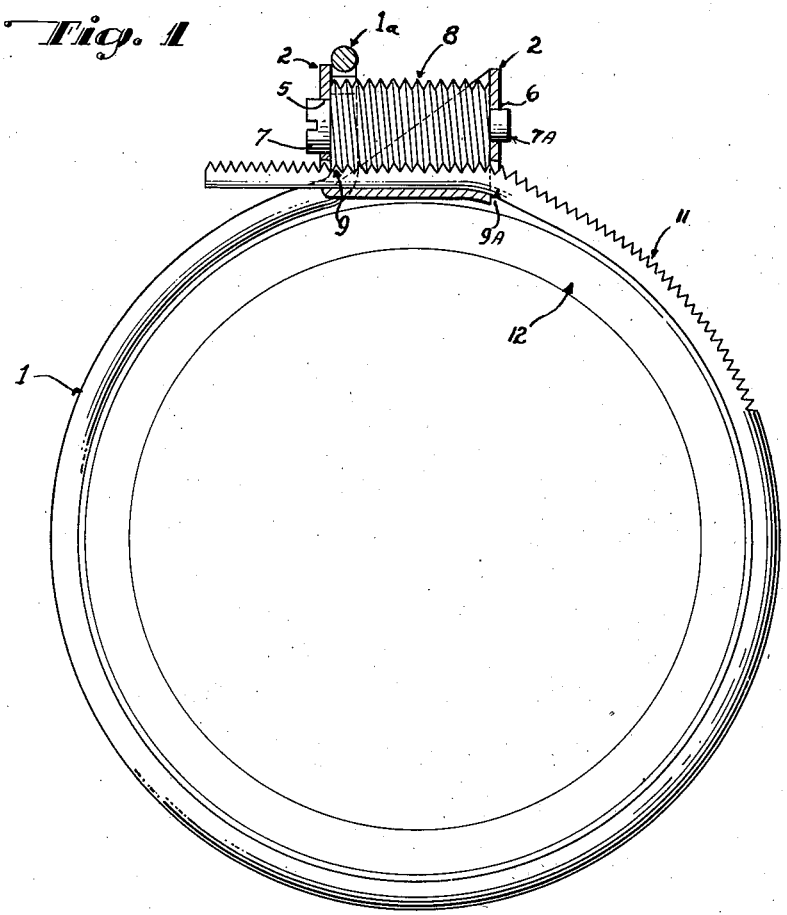
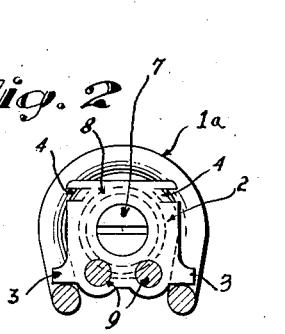
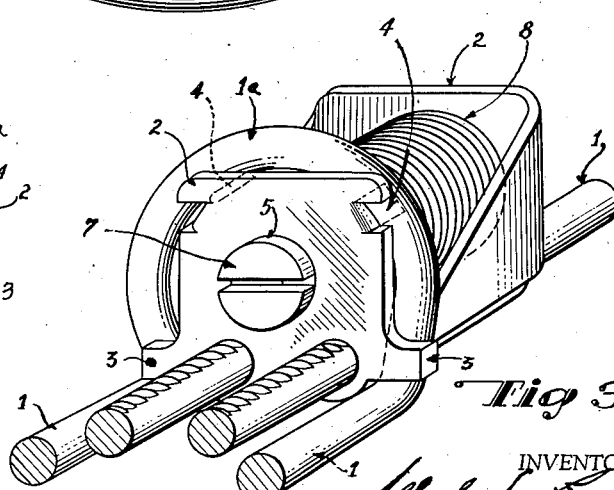
INVENTOR.
ATTORNEY.

Patented Feb. 8, 1949

2,461,234

UNITED STATES PATENT OFFICE 2,461,234

ADJUSTABLE CLAMP

Albert A. Radtke, New York, N. Y.

Application May 18, 1945, Serial No. 594,522

5 Claims. (Cl. 24—19)

This invention relates to clamps; relates particularly to hose clamps, and relates especially to hose clamps having means for adjustment over a wide diametral range.

Practically all uses for rubber hose require that the ends of the hose be held in or on metal fittings, and one of the more difficult problems in the use of rubber hose has been the finding of means for clamping the hose firmly to the metal fitting by means which would hold it firmly yet be easy of application and removal, and adjustable over a wide range of hose diameters.

The present invention provides a simple, inexpensive clamping means adapted to encircling a hose, suitable for easy application, capable of very firm grip and adjustable over a wide range of hose diameters. The device consists broadly of a tie member adapted to encircle the hose, one end of which is attached to a box frame having therein a screw, the other end of the encircling member being provided with rack notches to be engaged by the screw, which, upon rotation, draws the end through the box frame, reducing the diameter of the resulting ring.

Thus the device of the invention provides a screw and rack adjusting means capable of cutting its own rack on a tie rod and capable of pulling a tie rod into firm engagement around a hose and hose fitting. Other objects and details of the invention will be apparent from the following description when read in connection with the accompanying drawing, wherein Fig. 1 is a side view, partly in section, of the device of the invention;

Fig. 2 is an end view of the traction member of the invention; and

Fig. 3 is a perspective view of the traction portion of the invention and the associated tie rods.

Referring to the invention, there is provided an encircling member 1, preferably consisting of a light rod or heavy wire doubled into a loop, as shown. The loop portion of 1a of the tie member 1 is passed around one end of a metal box frame member 2. The loop portion 1a may be held in position at the end of the frame member 2 by ears 3 and 4, as is particularly well shown in Fig. 3.

The frame 2 is box-shaped in outline and has bearing openings 5 and 6, at opposite ends, through which there passes the axle of a screw member 8 having bearing ends 7 and 7A which cooperate respectively with the bearing openings 5 and 6. At the bottom of the box member 2, guide openings 9, and 9A are provided at each end through which the ends of the tie member 1 are passed. The ends of the tie member 1 may be provided with serrations 11, as shown in Fig. 1, or may be left plain. In the latter case, the screw member 8 is desirably made of hardened steel and the tie member 1 is preferably made of relatively soft metal in order that the screw member 8 may cut matching threads, as is shown in Fig. 3.

In the operation of the device, the loop portion 1a of the tie member 1 is adjusted around the box member 2, and the tie member 1 is then passed around the hose 12 which is to be clamped in place, as shown in Fig. 1, and the ends of the tie member 1 are entered into the hole in the box member 2 opposite to the side surrounded by the loop member 1a, as is particularly well shown in Fig. 1. The application of a screw driver to the slotted end of the bearing end 7 carrying the screw 8, and rotation thereof draws the end of the tie member 1 through the guide opening 9, along the body of the screw and to the second guide opening 9. The rotation of the shaft member 7 may be continued until the tie member 1 is drawn solidly up against the hose member, thereby clamping it firmly in place.

To remove the clamp, the screw driver need merely be applied to the slotted head of the screw and rotated in the reverse direction to force the tie member 1 backward through the holes and release the clamp from engagement with the hose.

It may be noted that this device consists of but three parts; tie member, box frame, and screw, all of which are very easy to make, inexpensive, and easy to assemble. Accordingly, the device is exceedingly advantageous for the purposes designed. It is not to be limited to use as a hose clamp alone, since it is adapted to many other uses where a tractive action is desired. It may be used for applying tension to guy wires in place of the ordinary turn buckle, for which purpose it is highly efficient, since it is strongly resistant to slipping and is much less easily backed off by accident, since only a deliberate twist of the screw driver will move the screw 8. It is also adapted to many other clamping uses aside from merely hose clamp.

Thus the device of the invention provides a three-part clamp device particularly suitable for clamping tension to hold a hose on a metal fitting.

While there is above disclosed but a limited number of embodiments of the device of the invention, it is possible to provide still other embodiments without departing from the inventive concept herein disclosed and it is therefore desired that only such limitations be imposed on the appended claims as are stated therein or required by the prior art.

The invention claimed is:

1. A clamp member comprising in combination a box frame, a screw member having bearing ends journaled in said box, and a traction member engaged between the threads of said screw and said box comprising a looped rod having the ends symmetrically doubled back into an approximately parallel position, the loop being adapted to engage the said box frame, the parallel ends thereof being adapted to be bent around a cylindrical body and being adapted after passing around said body to engage between said box frame and the threads of said screw member.

2. A clamp member comprising in combination a box member having bearing openings at opposite ends thereof, a screw member having ends journaled in the openings in the said box, a slot in an end of said screw, and a traction member comprising a rod member doubled to form a mid loop portion and parallel extending portions, said loop being attached to said box member and said extending portions being adapted to be bent in parallelism around a body to be clamped, the end portions of said extended rod portions being adapted to pass through channels adjacent the screw journal holes in said box, between the said screw and the bottom of said box, the said end portions comprising a looped rod member, the loop cooperating with said box member, the end having serrations cooperating simultaneously with the said screw.

3. A clamp member comprising in combination a box member having bearing openings at opposite ends thereof, a screw member having ends journaled in the openings in the said box, and a slot in an end of said screw, the said screw being hardened, and a traction member comprising a rod forming a loop, with the respective ends thereof substantially parallel, the loop being adapted to engage the said box member, the parallel ends passing around an object to be clamped, the ends being adapted to pass through channels adjacent the screw journal holes in said box, between the said screw and the bottom of said box, the said traction member having serrations cooperating simultaneously with the said screw, the said traction member when the ends of said traction member are positioned in said channels between the said screw and the said box being sufficiently soft to permit the said screw to cut its own threads therein.

4. In a hose joint fitting which comprises the combination of a flexible hose member, a metal fitting, and a clamping member for holding said hose on said fitting the combination of a loop rod member having a mid-loop formed by doubling the ends back upon themselves into approximate parallelism, the ends of the loop being around said hose over said fitting; a box member engaging the loop in the said rod, a screw member journaled within said box, and a guide means through said box for holding the ends of said looped member in engagement with said screw member between the said screw member and the said box for the application of traction thereto.

5. In a clamp member, a box frame, a hardened screw therein, guide means between the bottom of said screw and the bottom of said box, and a rod member having a mid-loop formed therein by doubling the ends thereof back upon themselves into substantial parallelism, the said loop engaging said box, the said ends cooperating between said screw and said box and having a size greater than the width of said guide means and adapted to have serrations cut therein by said screw, and to be drawn through said passage by the action of said screw through the cuttings of said serrations.

ALBERT A. RADTKE.

REFERENCES CITED

The following references are of record in the file of this patent:

UNITED STATES PATENTS

| Number | Name | Date |
|---|---|---|
| 2,362,901 | Jamie | Nov. 14, 1944 |

FOREIGN PATENTS

| Number | Country | Date |
|---|---|---|
| 336,007 | France | Dec. 28, 1903 |
| 555,350 | Germany | July 22, 1932 |